(12) United States Patent
Chen et al.

(10) Patent No.: US 11,570,813 B2
(45) Date of Patent: Jan. 31, 2023

(54) ELECTRONIC DEVICES AND TRANSMISSION SYSTEMS

(71) Applicant: Advanced Semiconductor Engineering, Inc., Kaohsiung (TW)

(72) Inventors: Ting-Han Chen, Kaohsiung (TW); Yu-Chuang Hsu, Kaohsiung (TW); Alex Chi-Hong Chan, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 33 days.

(21) Appl. No.: 17/127,679

(22) Filed: Dec. 18, 2020

(65) Prior Publication Data
US 2022/0201754 A1    Jun. 23, 2022

(51) Int. Cl.
*H04W 74/08* (2009.01)

(52) U.S. Cl.
CPC ................ *H04W 74/0816* (2013.01)

(58) Field of Classification Search
None
See application file for complete search history.

(56) References Cited

U.S. PATENT DOCUMENTS

2013/0013331 A1*  1/2013  Horseman ............ A61B 5/0022
                                                          705/2

* cited by examiner

*Primary Examiner* — James P Duffy
(74) *Attorney, Agent, or Firm* — Foley & Lardner LLP

(57) ABSTRACT

An electronic device, a transmission system, and a transmission method are provided. The electronic device includes a capturing module, a processing module, and a transmission module. The capturing module is configured to receive a first set of signals. The processing module is configured to select a second set of signals from the first set of signals based on a condition. The transmission module is configured to transmit the second set of signals.

17 Claims, 8 Drawing Sheets

ELECTRONIC DEVICES AND TRANSMISSION SYSTEMS

BACKGROUND

1. Field of the Disclosure

The present disclosure relates to an electronic device, a transmission system, and a transmission method. In particular, the present disclosure relates to an electronic device, a transmission system, and a transmission method for wireless transmission.

2. Description of the Related Art

In a wireless communication system, electronic devices transmitted signal or data to other electronic components or to a central device (e.g., a server). Due to limited bandwidth of the wireless communication system, a network collision (or packet collision) may occur when more than one electronic device attempts to send signal or data on a network segment at the same time.

SUMMARY

In some embodiments, an electronic device includes a capturing module, a processing module, and a transmission module. The capturing module is configured to receive a first set of signals. The processing module is configured to select a second set of signals from the first set of signals based on a criterion. The transmission module is configured to transmit the second set of signals.

In some embodiments, a wireless transmission system includes a central device and N peripheral devices. The N peripheral devices are configured to transmit signals to the central device. N is an integer equal to or greater than 20. A correlation coefficient of signals transmitted from each of the peripheral devices to the central device is equal to or greater than 90%

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
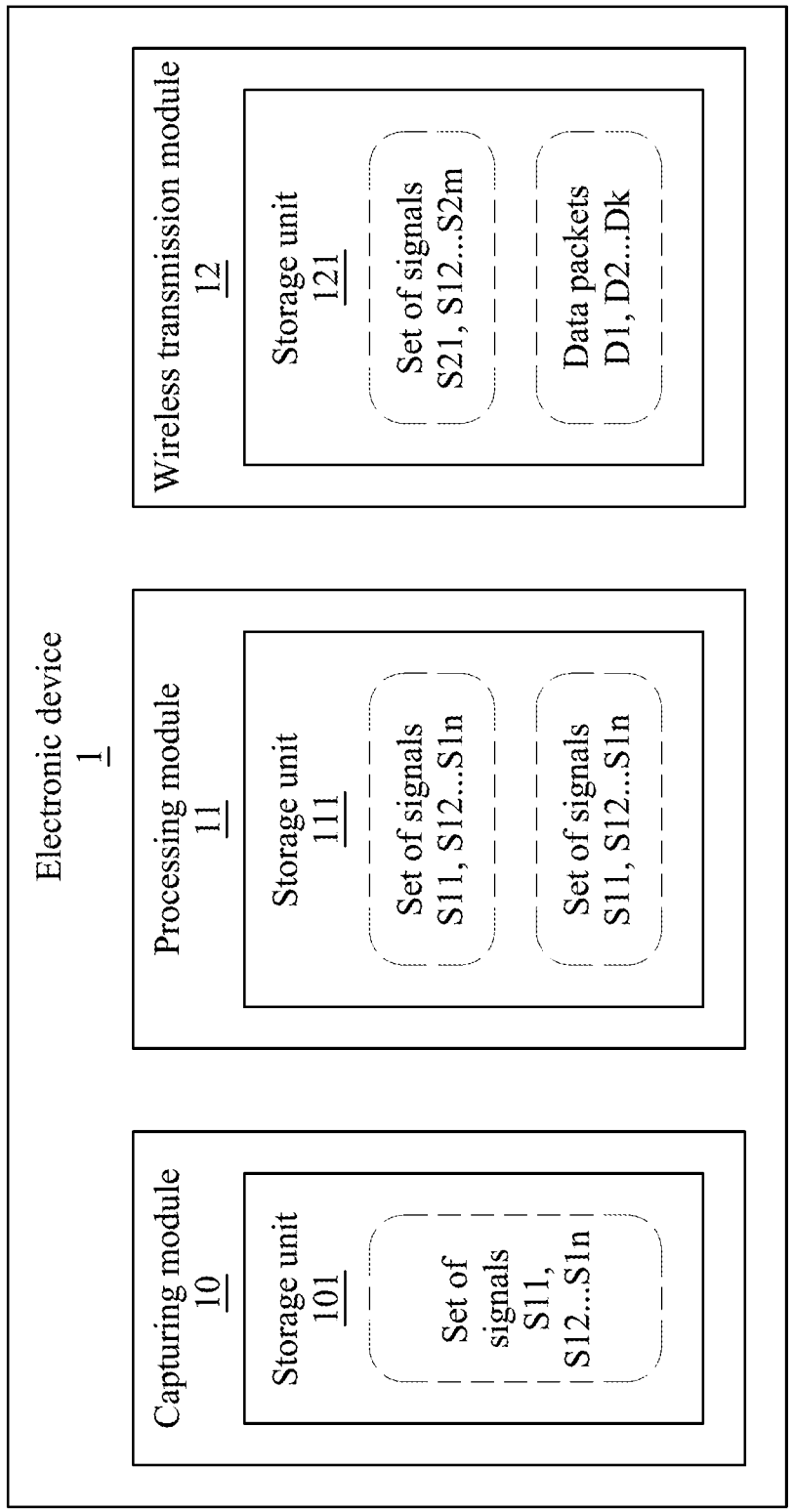
FIG. 1 illustrates a block diagram of an electronic device according to some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates a schematic diagram of an electronic device 1 according to some embodiments of the present disclosure. The electronic device 1 may include, for example, but are not limited to, a computer, a laptop, a mobile phone, a smart watch, a camera, an inspection instrument, etc. The electronic device 1 may include a capturing module 10, a processing module 11, and a wireless transmission module 12. The capturing module 10 and the processing module 11 may be electrically connected. Information, signals, data, or indications may be transmitted between the capturing module 10 and the processing module 11. The processing module 11 and the wireless transmission module 12 may be electrically connected. Information, signals, data, or indications may be transmitted between the processing module 11 and the wireless transmission module 12. In some embodiments, the capturing module 10, the processing module 11, and the wireless transmission module 12 may be separated from each other. For example, they are individual circuits and electrically connected to each other. In some embodiments, the capturing module 10, the processing module 11, and the wireless transmission module 12 may be integrated in an integrated circuit or a semiconductor chip. In some embodiments, a single processor may be designed with algorithms to perform the functions of the capturing module 10, the processing module 11, and the wireless transmission module 12.

The capturing module 10 may receive a set of signals S11, S12 . . . S1n, wherein "n" can be a positive integer. The set of signals S11, S12 . . . S1n may be come from one or more sensors in the neighborhood of the electronic device 1. The one or more sensors may include, for example, but are not limited to, a temperature sensor, a humidity sensor, an ambient light sensor, a proximity sensor, a G-sensor, a Gyroscope, a fingerprint sensor, a heart rate sensor, etc. Alternatively, the capturing module 10 may include one or more sensors attached to or embedded in the electronic device 1 and the one or more sensors detect the signals associated with electronic device 1.

The capturing module 10 may transmit the set of signals S11, S12 . . . S1n to the processing module 11. The capturing module 10 may include a storage unit 101 configured to store the set of signals S11, S12 . . . S1n. The storage unit 101 may include, but is not limited to, a register, a cache, or a memory. The storage unit 101 may store one or more sets of instructions. The wireless transmission module 10 may include a processor configured to execute the one or more sets of instructions and perform the above-mentioned operations.

Figures 2A, 2B, 2C:
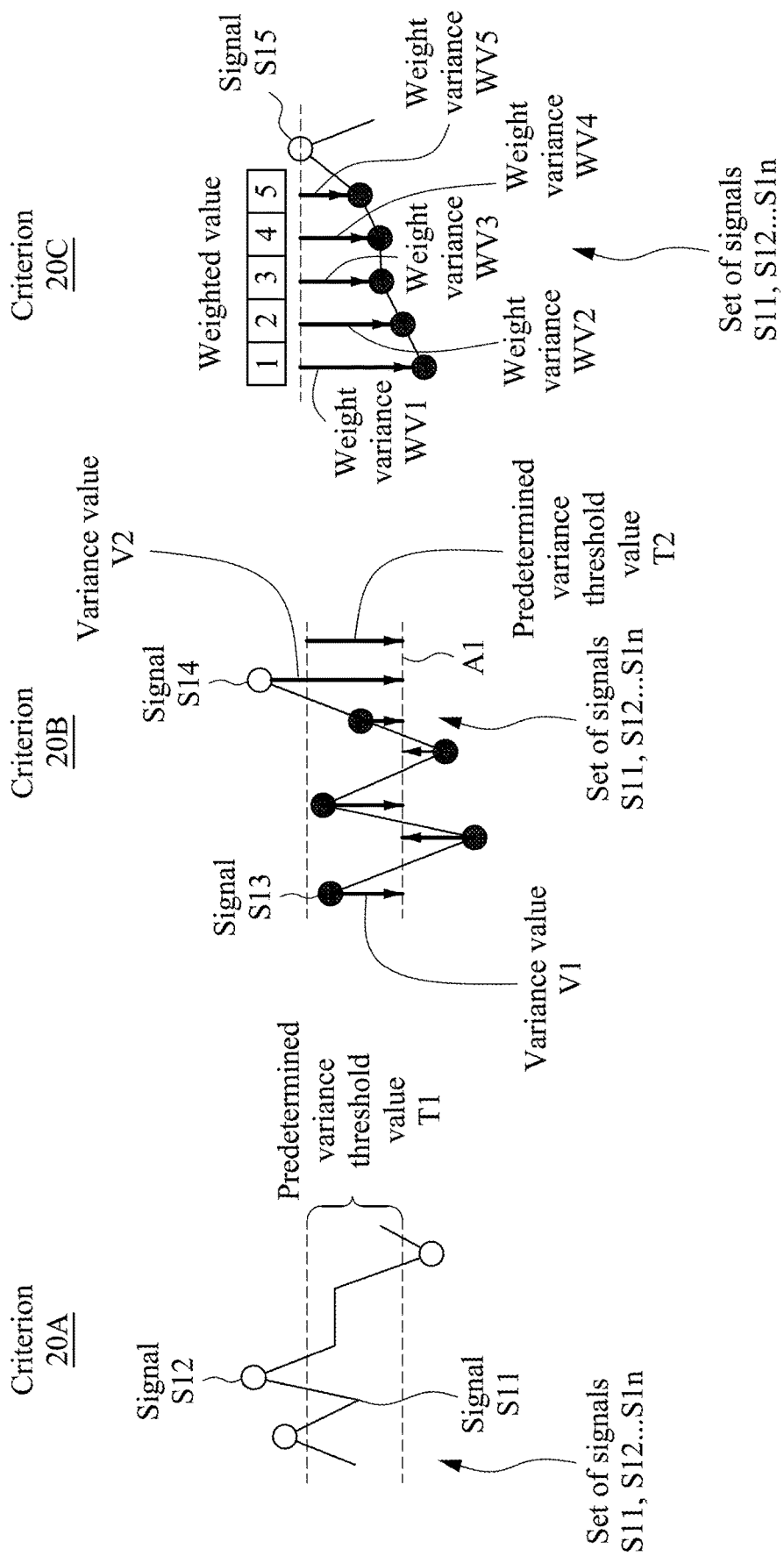
FIGS. 2A, 2B, and 2C each illustrate an illustrative diagram of a criterion according to some embodiments of the present disclosure.

The processing module 11 may receive the set of signals S11, S12 . . . S1n from the capturing module 10. The processing module 11 may select a set of signals S21, S22 . . . S2m from the set of signals S11, S12 . . . S1n based on one or more criteria, wherein "m" can be a positive integer. For example, FIGS. 2A, 2B, and 2C illustrate various criteria used for selecting the set of signals S21, S22 . . . S2m from the set of signals S1, S12 . . . S1n, in accordance with some embodiments of the present disclosure. In some embodiments, the processing module 11 may include a central processing unit (CPU), a microcontroller unit (MCU) or any other suitable processing units.

As shown in FIG. 2A, the criterion 20A represents an abnormal event, in which the value of the signals is beyond a predetermined range T1. In the criterion 20A, each signal of the set of signals S11, S12 . . . S1n is compared with the predetermined range T1. The predetermined range T1 is defined by a predetermined maximum value and a predetermined minimum value. For example, the predetermined range T1 may a range of relative humidity (RH) from 15% RH to 23% RH. The predetermined range T1 may a range of temperature from 18° C. to 25° C. Referring to FIG. 2A, a signal S11 of the set of signals S1, S12 . . . S1n has a value within the predetermined range T1, while a signal S12 of the set of signals S1, S12 . . . S1n has a value beyond the predetermined range T1. As result, the signal S12 is selected as one signal of the set of signals S21, S22 . . . S2m (e.g., the signal S21). Furthermore, one or more signals of the set of signals S1, S12 . . . S1n which have at least one value beyond the predetermined range T1 may be selected as the set of signals S21, S22 . . . S2m, wherein "m" is less than "n". In other words, the set of signals S21, S22 . . . S2m may have at least one value beyond the predetermined range T1.

As shown in FIG. 2B, the criterion 20B represents an abnormal event, in which the variance value of signals is greater a predetermined variance threshold value T2. In the criterion 20B, each of the set of signals S1, S12 . . . S1n has a variance value with respect to a predetermined average value A1. The predetermined average value A1 is defined by an average value of a portion of the set of signals S1, S12 . . . S1n. The portion of the set of signals S1, S12 . . . S1n may be continuous over a period of time. Referring to FIG. 2B, a signal S13 of the set of signals S11, S12 . . . S1n has a variance value V1 less than the predetermined variance threshold value T2, while signal S14 of the set of signals S1, S12 . . . S1n has a variance value V2 greater than the predetermined variance threshold value T2. The predetermined variance threshold value T2 may be one or two standard deviations of the set of signals S11, S12 . . . S1n or a certain percentage (e.g., 1~10%) of the predetermined average value A1. As result, the signal S14 is selected as one signal of the set of signals S21, S22 . . . S2m (e.g., the signal S21). Furthermore, one or more signals of the set of signals S11, S12 . . . S1n which have at least one variance value greater than the predetermined variance threshold value T2 may be selected as the set of signals S21, S22 . . . S2m, wherein "m" is less than "n". In other words, the set of signals S21, S22 . . . S2m may have at least one variance value greater than the predetermined variance threshold value T2.

As shown in FIG. 2C, the criterion 20C represents an abnormal event, in which the weight variance value of the signals is greater than a predetermined weighted variance threshold value. For example, the predetermined weighted variance threshold value may be 1.5% RH. The predetermined weighted variance threshold value may be 3° C. In the criterion 20C, each of the set of signals S11, S12 . . . S1n has a weight variance value. Referring to FIG. 2B, a signal S15 of the set of signals S11, S12 . . . S1n has a weight variance value equal to the weighted average of the weight variances (e.g., weight variance WV1, WV2, WV3, WV4, WV5) between the signal S15 and its preceding signals of the set of signals S11, S12 . . . S1n. The weight variance WV1 is equal to the product of a weight value (e.g., 1) and the variance between the signal S15 and the first preceding signal. Similarly, the weight variance WV2, WV3, WV4, WV5 is equal to the product of a weight value (e.g., 2, 3, 4, 5) and the variance between the signal S15 and the second, third, fourth, fifth preceding signal, respectively. When the weight variance value of signal S15 is greater than the predetermined variance threshold value, the signal S15 would be selected as one signal of the set of signals S21, S22 . . . S2m (e.g., the signal S21). Furthermore, one or more signals of the set of signals S11, S12 . . . S1n which have at least one weight variance value greater than the predetermined weight variance threshold value may be selected as the set of signals S21, S22 . . . S2m, wherein "m" is less than "n". In other words, the set of signals S21, S22 . . . S2m may have at least one weight variance value greater than the predetermined weight variance threshold value.

Referring again to FIG. 1, the processing module 11 may select the set of signals S21, S22 . . . S2m from the set of signals S11, S12 . . . S1n based on one of the criteria 20A, 20B, and 20C. Alternatively, the processing module 11 may select the set of signals S21, S22 . . . S2m from the set of signals S11, S12 . . . S1n based on the combination of the criteria 20A, 20B, and 20C. For example, one or more signals of the set of signals S11, S12 . . . S1n which comply with the criteria 20A and 20B, 20B and 20C, 20A and 20C, or 20A, 20B, and 20C may be selected as the set of signals S21, S22 . . . S1m. Other criteria that are derived from a quality control method (e.g., statistical process control (SPC)) may also be used for selecting the set of signals S21, S22 . . . S2m from the set of signals S11, S12 . . . S1n. The processing module 11 further includes a storage unit 111 configured to store the set of signals S11, S12 . . . S1n and/or the set of signals S21, S22 . . . S2m. The storage unit 111 may include, but is not limited to, a register, a cache, or a memory. The storage unit 111 may store one or more sets of instructions. The processing module 11 may include a processor configured to execute the one or more sets of instructions and perform the above-mentioned operations.

The wireless transmission module 12 may receive the set of signals S21, S22 ... S2m. The wireless transmission module 12 may transmit the set of signals S21, S22 ... S2m to an external device. The distance between the electronic device 1 and the external device may be equal to or less than 10 m. The wireless transmission module 12 may transmit the set of signals S21, S22 ... S2m via Bluetooth, Bluetooth low energy, Wi-Fi, or NFC. The wireless transmission module 12 may transmit the set of signals S21, S22 ... S2m simultaneously or separately. The wireless transmission module 12 may generate a data packet D1 based on the set of signals S21, S22 ... S2m. The data packet D1 may include the set of signals S21, S22 ... S2m. The wireless transmission module 12 may transmit the data packet D1 to the external device. In an alternative embodiment, the wireless transmission module 12 may generate a plurality of data packets D1, D2 ... Dk based on the set of signals S21, S22 ... S2m. The plurality of data packets D1, D2 ... Dk may include the set of signals S21, S22 ... S2m. The wireless transmission module 12 may transmit the plurality of data packets D1, D2 ... Dk simultaneously or separately. The wireless transmission module 12 further includes a storage unit 121 configured to store the set of signals S21, S22 ... S2m and/or the plurality of data packets D1, D2 ... Dk. The storage unit 121 may include, but is not limited to, a register, a cache, or a memory. The storage unit 121 may store one or more sets of instructions. The wireless transmission module 12 may include a processor configured to execute the one or more sets of instructions and perform the above-mentioned operations.

The electronic device 1 is able to select the set of signals S21, S22 ... S2m from the set of signals S11, S12 ... S1n based on at least one criterion (e.g., criterion 20A, 20B, or 20C) that represents one or more abnormal events. In other words, the electronic device 1 is free from transmitting all of the set of signals S11, S12 ... S1n. It decreases the frequency of data transmission. The power consumption of the data transmission (e.g., wireless data transmission) can be reduced. In some comparative embodiments, there are one or more electronic devices in the same place that wirelessly transmit data packets at the same time. Owing to a limited bandwidth, the packet collision may inevitably occur among the data packets transmitted from different electronic devices and may thus increase the packet loss rate. In the present disclosure, the electronic device 1 transmits the set of signals S21, S22 ... S2m which represent one or more abnormal events, instead of the set of signals S11, S12 ... Sim. The amount of data transmitted during the same period of time can be significantly reduced. As such, it may prevent the packet collision and reduce the packet loss rate. Furthermore, the energy consumption of the electronic device 1 can be reduced by transmitting less data.

As discussed above, the processing module 11 includes the storage unit 111 (e.g., a register) storing the set of signals S1, S12 ... S1n. The wireless transmission module 12 may include a timer. When the timer expires, the wireless transmission module is configured to reset the timer and to transmit the latest signal of the set of signals S11, S12 ... S1n stored in the storage unit 111. The wireless transmission module 12 may periodically transmit at least one signal of the set of signals S11, S12 ... S1n. It avoids an extremely low sample rate and improves the reliability of the data transmitted from the electronic device 2. For example, the retention rate of data can be lower without sacrificing the correlation coefficient of data (e.g., the retention rate of data is equal to or less than 60%, and the correlation coefficient is equal to or greater than 90%).

Figure 3:
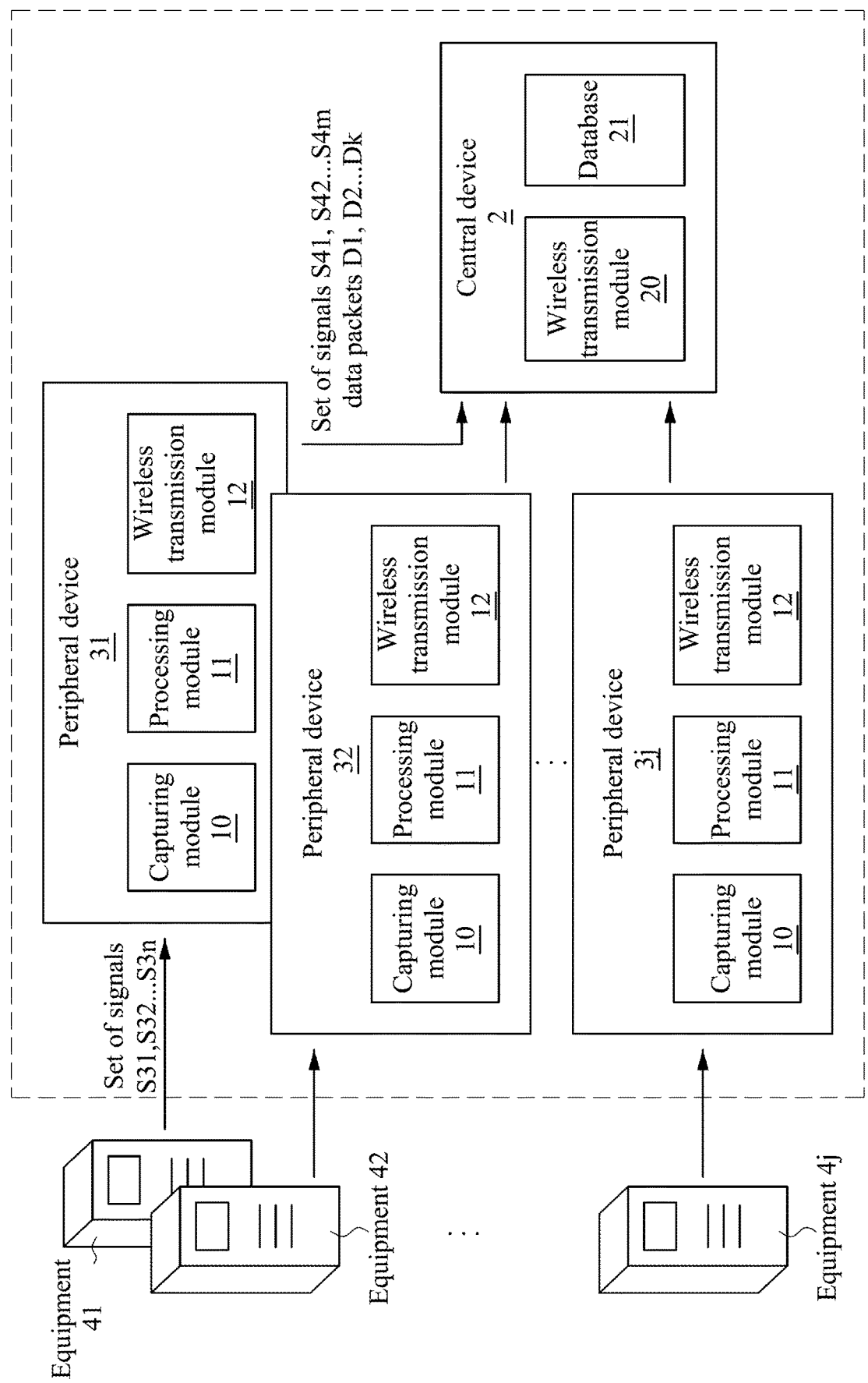
FIG. 3 illustrates a schematic diagram of a transmission system according to some embodiments of the present disclosure.

FIG. 3 illustrates a schematic diagram of a transmission system 100 according to some embodiments of the present disclosure. The transmission system 100 includes a central device 2 and a plurality of peripheral devices 31, 32 ... 3j, wherein j is a positive integer. "j" may be equal to or greater than 20. The peripheral devices 31, 32 ... 3j may be similar to the electronic device 1 as shown in FIG. 1. The peripheral devices 31, 32 ... 3j may each include the capturing module 10, the processing module 11, and the wireless transmission module 12 as shown in FIG. 1.

The central device 2 and the peripheral devices 31, 32 ... 3j are wirelessly connected. Information, signals, data, or indications can be transmitted between the central device 2 and the peripheral devices 31, 32 ... 3j. The central device 2 may include a wireless transmission module 20 and a database 21. The wireless transmission module 20 may receive data from or transmit data to the wireless transmission module 10 of each of the peripheral devices 31, 32 ... 3j. The database 21 may store the data received from the peripheral devices 31, 32 ... 3j.

A plurality of equipment 41, 42 ... 4j may be electrically connected with the transmission system 100. In some embodiments, the peripheral devices 31, 32 ... 3j may be associated with the equipment 41, 42 ... 4j, respectively. For example, the peripheral devices 31, 32 ... 3j may be physically attached to or close to the equipment 41, 42 ... 4j, respectively. The peripheral devices 30, 31 ... 3j may receive/detect a set of signals from the equipment 41, 42 ... 4j, respectively. The set of signals may include physical parameters. The physical parameters may include, but are not limited to, temperature, humidity, frequency, amplitude, conductivity, light irradiation, or pH value, etc.

The capturing module 10 of the peripheral device 31 may receive/detect a set of signals S31, S32, S3n from the equipment 41. The processing module 11 of the peripheral device 31 may select a set of signals S41, S42 ... S4m from the set of signals S31, S32 ... S3n based on one or more of the criteria 20A, 20B, and 20C as shown in FIGS. 2A, 2B, and 2C. The wireless transmission module 12 may transmit the set of signals S41, S42 ... S4m to wireless transmission module 20 of the central device 2. The wireless transmission module 12 may transmit the set of signals S41, S42 ... S4m to the central device 2 simultaneously or separately. The central device 2 (e.g., the database 21) may be configured to monitor the performance of equipment 41, 42 ... 4j by analyzing the signals S41, S42 ... S4m transmitted from the peripheral device 31. Furthermore, the wireless transmission module 12 may include a timer. When the timer expires, the wireless transmission module is configured to reset the timer and to transmit the latest signal of the set of signals S31, S32 ... S3n stored in a storage unit of the processing module 11 as one of signals S41, S42 ... S4m. Accordingly, due to the decent stability of the equipment, the problem of an extremely low amount of data being transmitted may be avoided.

In some embodiments, the wireless transmission module 12 may transmit a data packet D1 including the set of signals S41, S42 ... S4m to the central device 2. In some embodiments, the wireless transmission module 12 may transmit a plurality of data packets D1, D2 ... Dk including the set of signals S41, S42 ... S4m to the central device 2 simultaneously or separately. The central device 2 may analyze the set of signals S41, S42 ... S4m to monitor the operation of the equipment 41. Furthermore, the peripheral device 32 ... 3j may process the signals received from the equipment 42 . . . 4*j* by performing a function similar to that of peripheral device 31. In an alternative embodiment, the peripheral device 31 may receive signals from a plurality of equipment.

Figure 4:
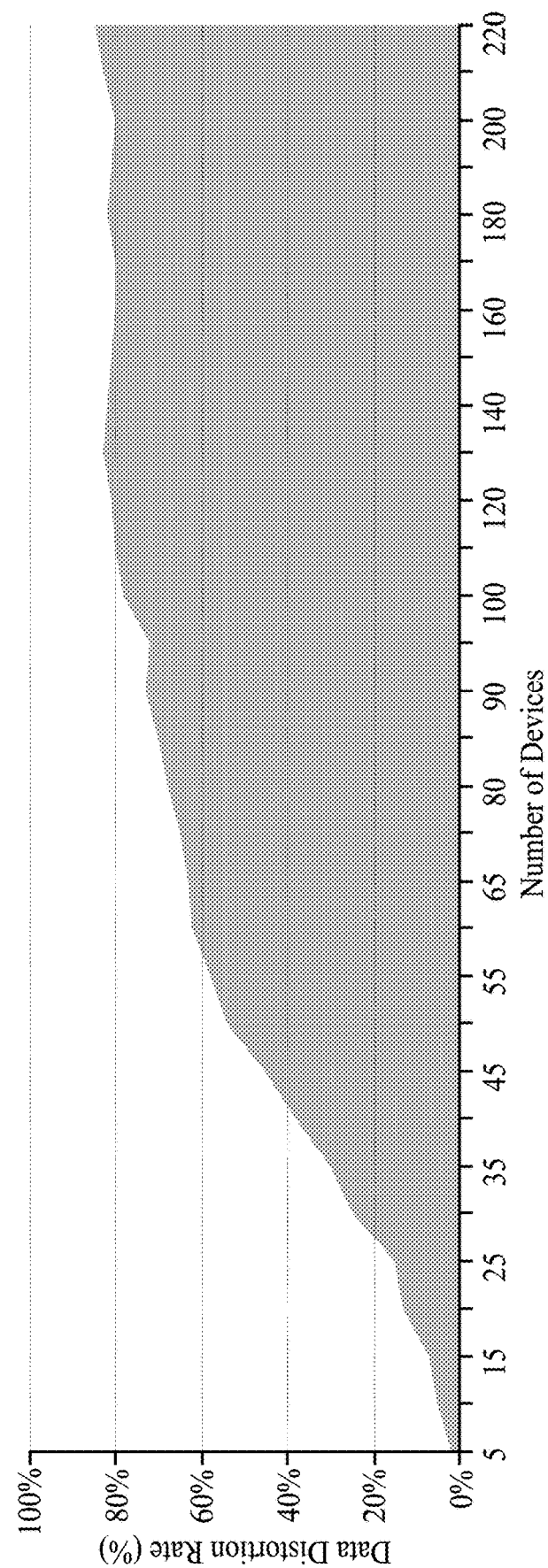
FIG. 4 illustrates an exemplary line plot of data distortion rate according to some comparative embodiments.

In some comparative embodiments, a transmission system may include a central device and a plurality of peripheral devices. The peripheral devices may receive a set of signals from a plurality of equipment. Afterwards, the peripheral devices may transmit a plurality of data packets including the complete set of signals to the central device. As factories grow in size, the quantity of equipment and peripheral devices therein would increase. Thus, the quantity of data packets transmitted at the same time and in the same place would increase. However, owing to a limited bandwidth, packet collision would inevitably occur among the increased data packets and may thus cause packet loss, which in turn increases the data distortion rate. Referring to FIG. 4, when the number of devices is equal to or more than 20, the data distortion rate goes beyond the accepted threshold (e.g., less than 10%). As shown in FIG. 4, when the number of devices is equal to or more than 50, the data distortion rate would reach 50%. When the number of devices is equal to or more than 100, the data distortion rate would reach 80%. Hence, the severe data distortion as shown in FIG. 4 results in serious problems with respect to monitoring the devices.

In the present disclosure, the peripheral devices (e.g., the peripheral device 31) transmit selected signals (e.g., the set of signals S41, S42 . . . S4*m*), instead of all of the received signals (e.g., the set of signals S31, S32 . . . S3*n*) from the equipment (e.g., the equipment 41). In some embodiments, the number of the peripheral devices is equal to or greater than 20 (i.e., "j" is equal to or greater than 20). In some embodiments, the number of the peripheral devices may be equal to or greater than 50, 75, 100, 125, 150, 175, 200 or more. The retention rate of the data transmitted by the peripheral devices 31, 32 . . . 3*j* can be less than 60%. Hence, the amount of data transmitted during the same period of time can be significantly reduced. As such, it may prevent packet collision and the energy consumption of the transmission system 100 can be reduced. Meanwhile, the data distortion rate can be equal to or less than 10%. In other words, a correlation coefficient (e.g., Pearson's correlation coefficient) of signals transmitted from each of the peripheral devices 31, 32 . . . 3*j* to the central device 2 can be equal to or greater than 90%. Hence, the signals being transmitted with great reliability allows the central device 2 to monitor the equipment (e.g., equipment 41, 42 . . . 4*j*).

Figure 5A:
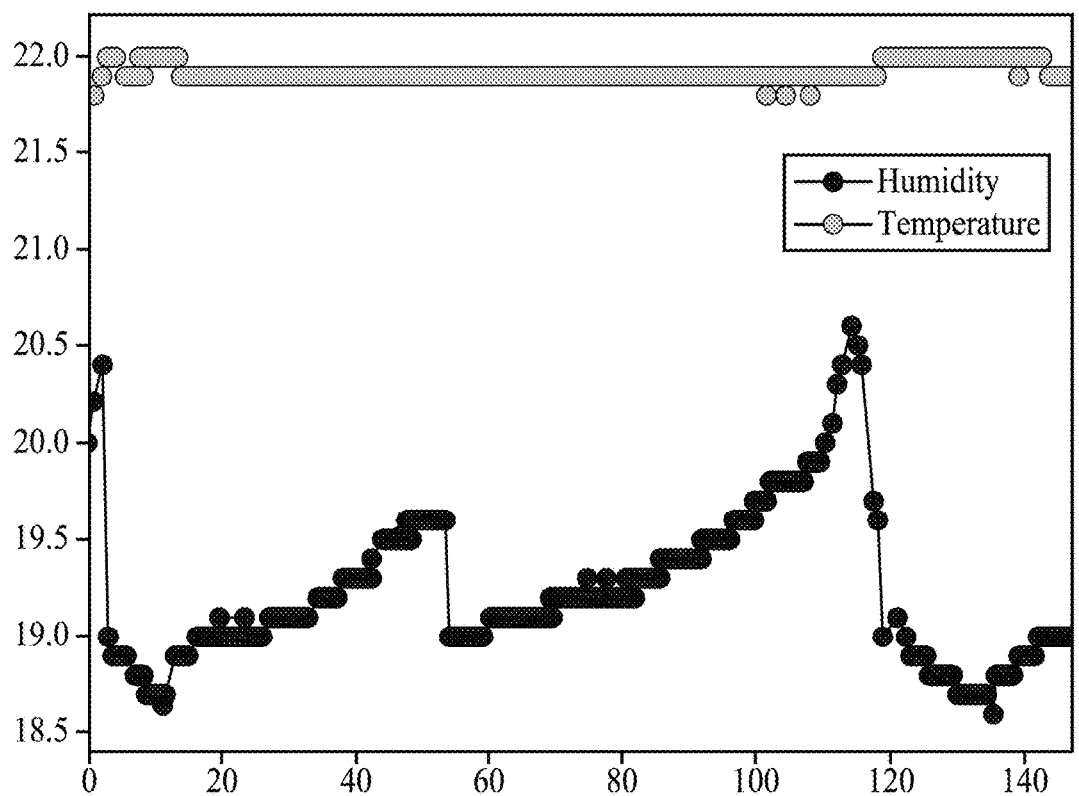
FIG. 5A illustrates an exemplary line plot of the original temperature data and original humidity data of a piece of equipment according to some embodiments of the present disclosure.
Figure 5B:
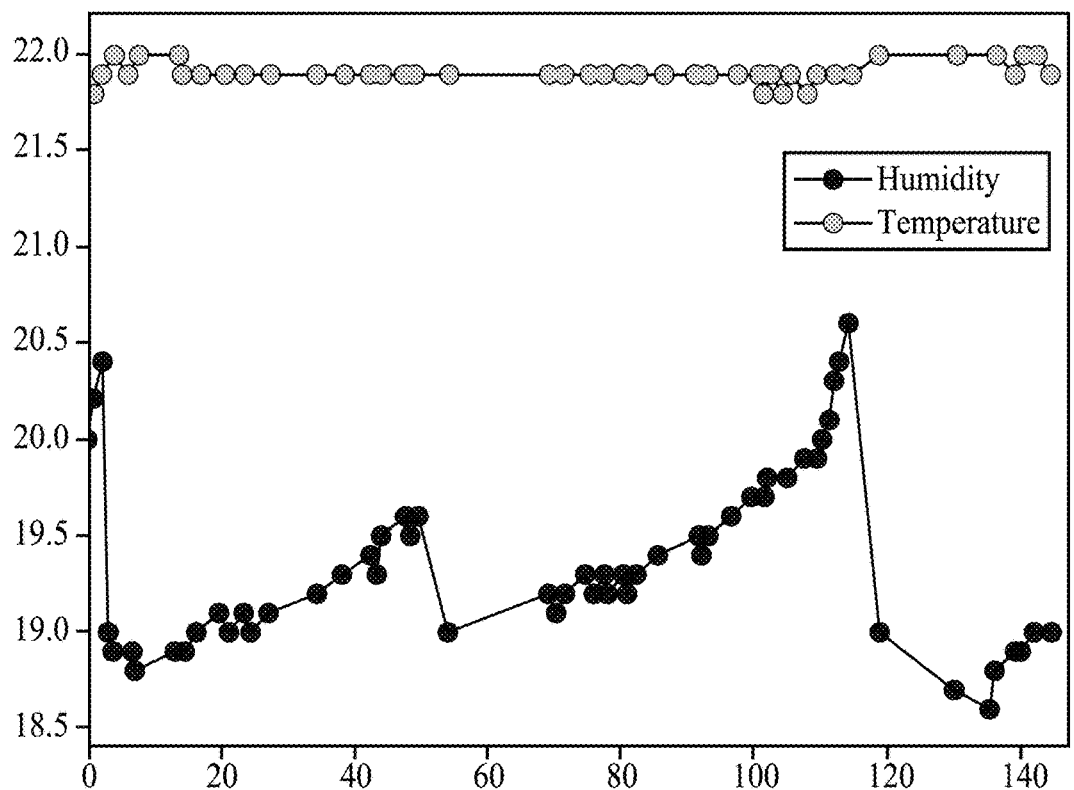
FIG. 5B illustrates an exemplary line plot of the selected temperature data and selected humidity data of a piece of equipment, said data being transmitted by a peripheral device according to some embodiments of the present disclosure.

FIG. 5A illustrates an exemplary line plot of the original temperature data and original humidity data of a piece of equipment (e.g., equipment 41). FIG. 5B illustrates an exemplary line plot of the selected temperature data and selected humidity data of a piece of equipment (e.g., equipment 41), said data being transmitted by a peripheral device (e.g., a peripheral device 32). The exemplary line plot of FIG. 5B depicts the line plot of selected data transmitted from the equipment 41 based on one or more of the criteria 20A, 20B, and 20C. The selected data maintains a retention rate of about 40%, but has a data distortion rate of about 2% (i.e., a Pearson's coefficient of about 98%).

Figure 6A:
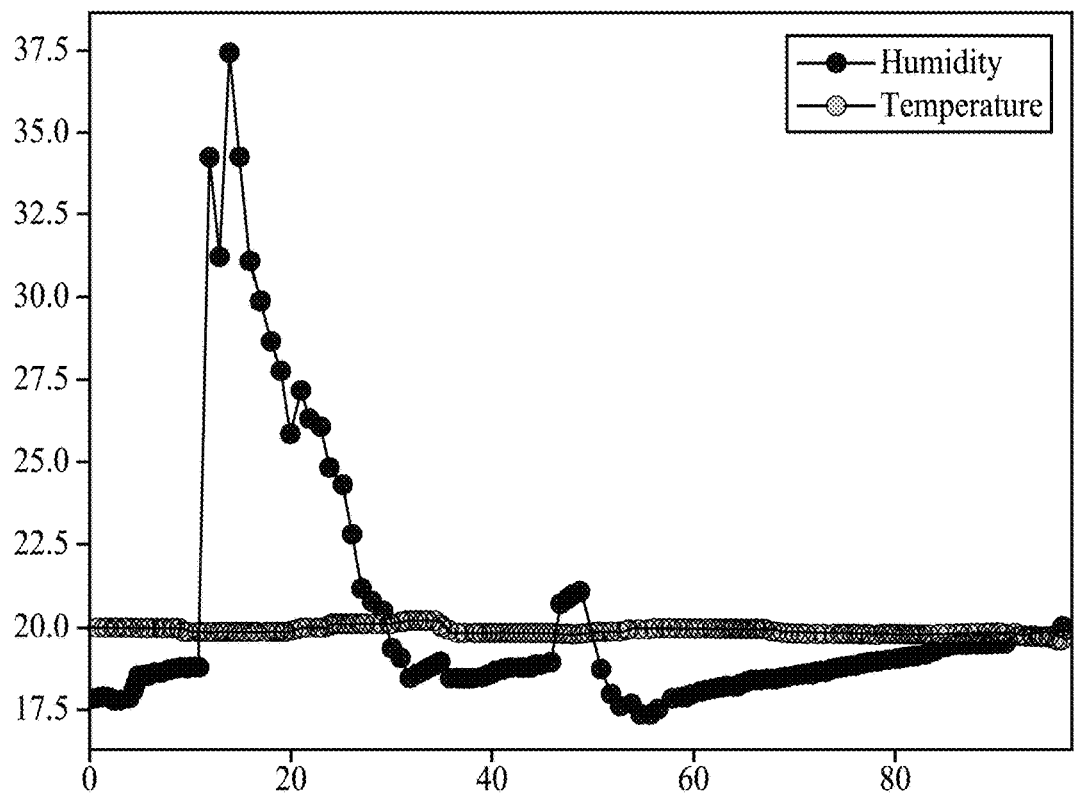
FIG. 6A illustrates an exemplary line plot of the original temperature data and original humidity data of a piece of equipment according to some embodiments of the present disclosure.
Figure 6B:
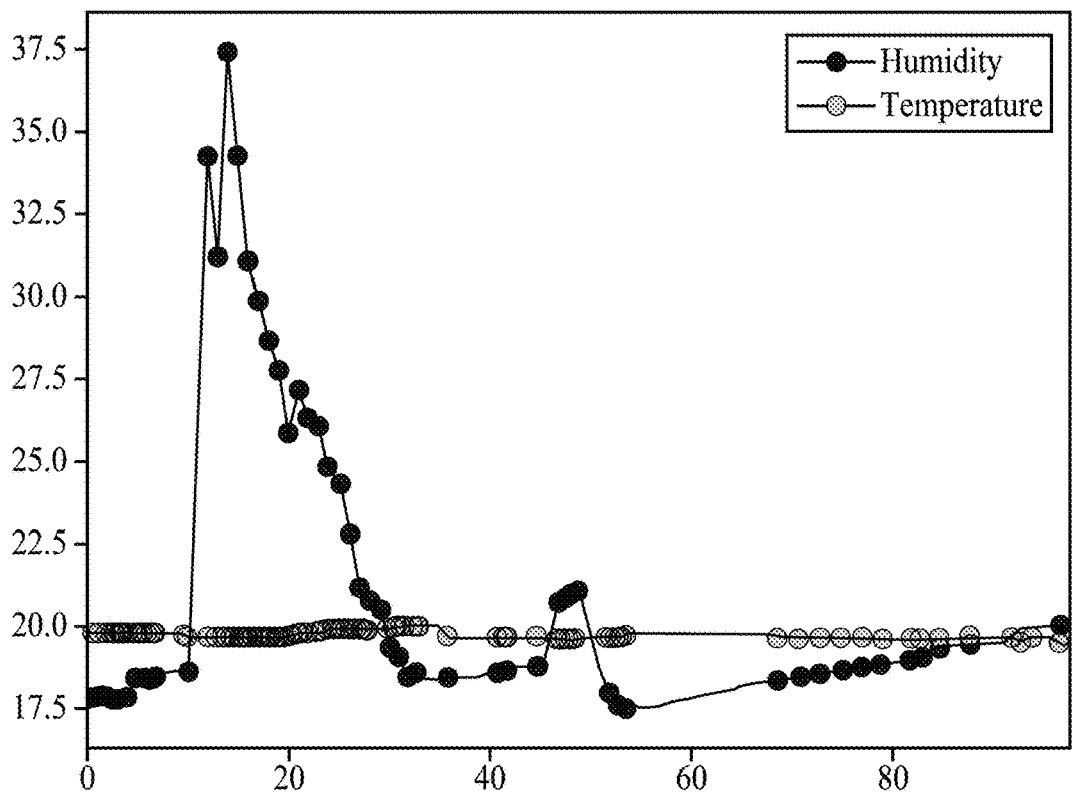
FIG. 6B illustrates an exemplary line plot of the selected temperature data and selected humidity data of a piece of equipment, said data being transmitted by a peripheral device according to some embodiments of the present disclosure.

FIG. 6A illustrates an exemplary line plot of the original temperature data and original humidity data of a piece of equipment (e.g., equipment 42). FIG. 6B illustrates an exemplary line plot of the selected temperature data and selected humidity data of a piece of equipment (e.g., equipment 42), said data being transmitted by a peripheral device (e.g., a peripheral device 32). The exemplary line plot of FIG. 6B depicts the line plot of selected data transmitted from the equipment 42 based on one or more of the criteria 20A, 20B, and 20C. The selected data maintains a retention rate of about 60%, but has a data distortion rate of about 2% (i.e., a Pearson's coefficient of about 98%).

Figure 7:
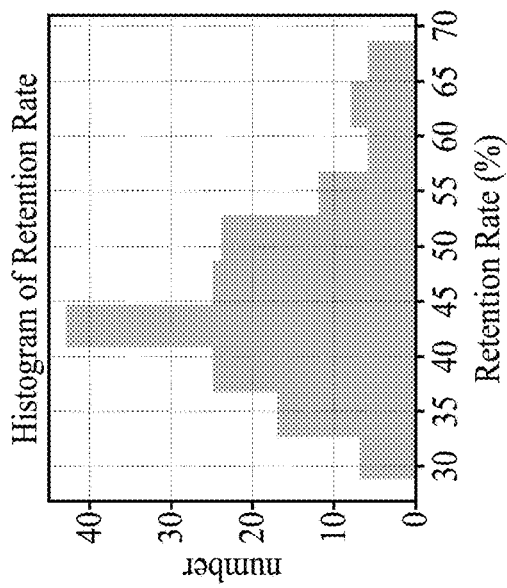
FIG. 7 illustrates an exemplary histogram of the retention rate of the data transmitted by the transmission system according to some embodiments of the present disclosure.

FIG. 7 illustrates an exemplary histogram of the retention rate of the data transmitted by the transmission system 100. The transmission system 100 may include around 170 peripheral devices. The average retention rate is around 45% and the standard deviation is around 10%. The retention rate of the data transmitted by 95% of the peripheral devices 31, 32 . . . 3*j* can be less than 60%.

Figure 8B:
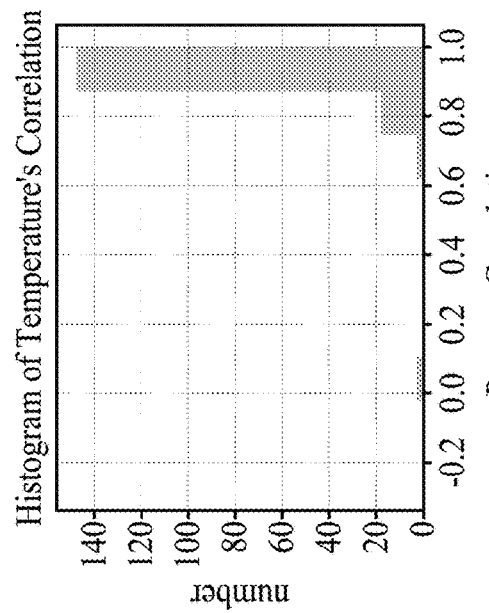
FIG. 8B illustrates an exemplary histogram of the Pearson's correlation regarding temperature data transmitted by a transmission system according to some embodiments of the present disclosure.
Figure 8A:
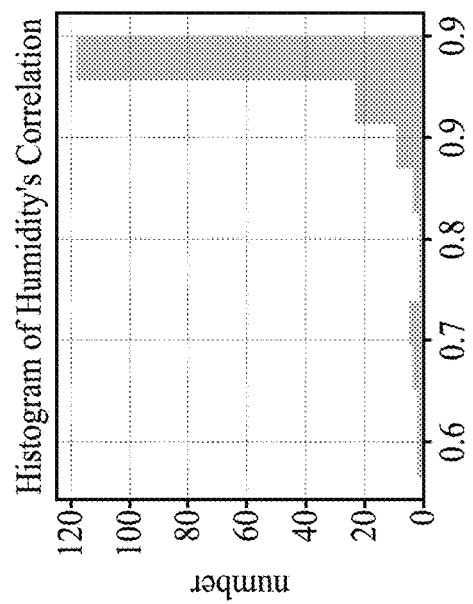
FIG. 8A illustrates an exemplary histogram of the Pearson's correlation regarding humidity data transmitted by a transmission system according to some embodiments of the present disclosure.

FIG. 8A illustrates an exemplary histogram of the Pearson's correlation regarding humidity data transmitted by the transmission system 100. The transmission system 100 may include around 170 peripheral devices. The average Pearson's coefficient is around 94% (i.e., data distortion rate of 6%) and the standard deviation is around 1%. FIG. 8B illustrates an exemplary histogram of the Pearson's correlation regarding temperature data transmitted by the transmission system 100. The average Pearson's coefficient is around 92% (i.e., data distortion rate of 8%) and the standard deviation is around 1.5%. As discussed in FIG. 4, the data distortion rate goes beyond the accepted threshold (i.e., above 10%) when the number of devices is equal to or more than 20. In comparison, the data distortion rate of the transmission system 100 is still maintained at lower than the accepted threshold (i.e., less than 10%) when the number of peripheral devices 31, 32 . . . 3*j* is 170.

Figure 9:
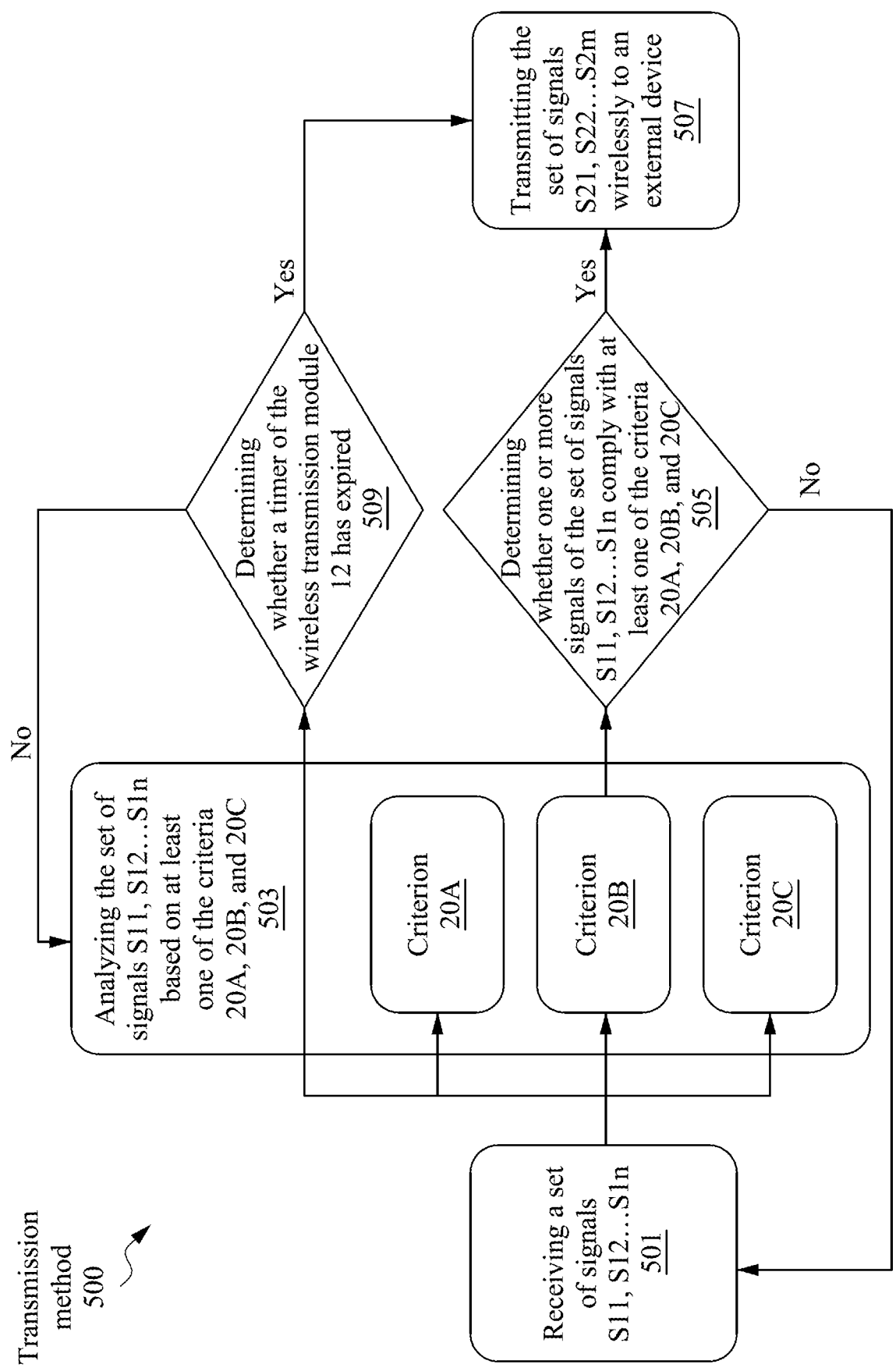
FIG. 9 illustrates a flow chart of a transmission method according to some embodiments of the present disclosure.

FIG. 9 illustrates a flow chart of a transmission method 500 according to some embodiments of the present disclosure. The transmission method 500 may include operations 501, 503, 505, 507, and 509. The electronic device 1 as shown in FIG. 1 and the peripheral devices 31, 32 . . . 3*j* as shown in FIG. 3 may perform the operations of the transmission method 500.

In the operation 501, the capturing module 10 receives a set of signals S11, S12 . . . S1*n*.

In the operation 503, the processing module 11 analyzes the set of signals S11, S12 . . . S1*n* based on at least one of the criteria 20A, 20B, and 20C of FIGS. 2A, 2B, and 2C. The processing module 11 determines whether one or more signals of the set of signals S11, S12 . . . S1*n* comply with at least one of the criteria 20A, 20B, and 20C. For example, the processing module 11 may determine whether one or more signals of the set of signals S1*l*, S12 . . . S1*n* have at least one value beyond the predetermined range T1 (i.e., the criterion 20A). The processing module 11 may determine whether one or more signals of the set of signals S11, S12 . . . S1*n* have at least one variance value greater than the predetermined variance threshold value T2 (i.e., the criterion 20B). The processing module 11 may determine whether one or more signals of the set of signals S11, S12 . . . S1*n* have at least one weighted variance value greater than the predetermined weighted variance threshold value T3 (i.e., the criterion 20C).

In the operation 505, if one or more signals of the set of signals S1*l*, S12 . . . S1*n* comply with at least one of the criteria 20A, 20B, and 20C, the processing module 11 may select a set of signals S21, S22 . . . S2*m* from the set of signals S11, S12 . . . S1*n* based on at least one of the criteria 20A, 20B, and 20C, and the procedure may move to the operation 507. If no signal of the set of signals S11, S12 . . . S1*n* complies with at least one of the criteria 20A, 20B, and 20C, the procedure may move to the operation 501.

In the operation 507, the wireless transmission module 12 transmits the set of signals S21, S22 . . . S2*m* wirelessly to an external device. The transmission distance of the set of signals S21, S22 . . . S2m may be equal to or less than 10 m. The wireless transmission module 12 may transmit the set of signals S21, S22 . . . S2m via Bluetooth, Bluetooth low energy, Wi-Fi, or NFC. The wireless transmission module 12 may transmit the set of signals S21, S22 . . . S2m simultaneously or separately. In some embodiments, the wireless transmission module 12 may transmit a data packet D1 including the set of signals S21, S22 . . . S2m. The wireless transmission module 12 may transmit a plurality of data packets D1, D2 . . . Dk including the set of signals S21, S22 . . . S2m.

In the operation 509, if a timer of the wireless transmission module 12 has expired, the wireless transmission module 12 resets the timer and transmits the latest signal of the set of signals S11, S12 . . . S1n stored in a register of the processing module 11 to the central device 2. If the timer has not expired, the procedure may move to the operation 503.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatuses to function in a particular manner, such that the instructions stored in the computer-readable medium produce an article of manufacture, including instruction means which implement the function/act specified in the flow diagram and/or block diagram block or blocks.

As used herein, the singular terms "a," "an," and "the" may include plural referents unless the context clearly dictates otherwise.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An electronic device, comprising:
a capturing module configured to receive a first set of signals;
a processing module configured to select a second set of signals from the first set of signals based on a criterion; and
a wireless transmission module configured to transmit the second set of signals,
wherein the criterion comprises:
the second set of signals has at least one variance value with respect to a predetermined average value, the at least one variance value greater than a predetermined variance threshold value, and
the predetermined average value is defined by an average value of a portion of the first set of signals.

2. An electronic device, comprising:
a capturing module configured to receive a first set of signals;
a processing module configured to select a second set of signals from the first set of signals based on a criterion; and
a wireless transmission module configured to transmit the second set of signals,
wherein the criterion comprises:
the second set of signals has at least one weighted variance value greater than a maximum weighted variance threshold value, and
the at least one weighted variance value includes a sum of the weighted variances between one signal of the first set of signals and its preceding ones of the first set of signals.

3. An electronic device, comprising:
a capturing module configured to receive a first set of signals;
a processing module configured to select a second set of signals from the first set of signals based on a criterion; and
a wireless transmission module configured to transmit the second set of signals,
wherein the ratio of the second set of signals to the first set of signals is equal to or less than 60%.

4. The electronic device of claim 3, wherein a correlation coefficient between the first set of signals and the second set of signals is equal to or greater than 90%.

5. The electronic device of claim 3, wherein the wireless transmission module is further configured to transmit the second set of signals simultaneously or separately.

6. The electronic device of claim 3, wherein the criterion comprises:
the second set of signals has at least one value beyond a predetermined range, and
the predetermined range is defined by a predetermined maximum value and a predetermined minimum value.

7. The electronic device of claim 3, wherein:
the processing module comprises a register configured to store the first set of signals,
the wireless transmission module comprises a timer, and when the timer expires, the wireless transmission module is configured to reset the timer and to transmit the latest signal of the first set of signals stored in the register.

8. The electronic device of claim 3, wherein the transmitting module is further configured to transmit a data packet including the second set of signals.

9. The electronic device of claim 3, wherein the transmitting module is further configured to transmit the second set of signals to an external device, wherein the distance between the electronic device and the external device is equal to or less than 10 m.

10. The electronic device of claim 3, wherein the wireless transmission module is configured to transmit the second set of signals via Bluetooth, Bluetooth low energy, Wi-Fi, or NFC.

11. An electronic device, comprising:
a capturing module configured to receive a first set of signals;
a processing module configured to select a second set of signals from the first set of signals based on a criterion; and
a wireless transmission module configured to transmit the second set of signals,
wherein a correlation coefficient between the first set of signals and the second set of signals is equal to or greater than 90%, and
wherein the correlation coefficient includes Pearson's correlation coefficient.

12. A wireless transmission system, comprising:
a central device; and
N peripheral devices configured to transmit signals to the central device,
wherein N is an integer equal to or greater than 20, and
a correlation coefficient of signals transmitted from each of the peripheral devices to the central device is equal to or greater than 90%,
wherein at least one of the peripheral devices comprises:
a capturing module configured to receive a first set of signals;
a processing module configured to select a second set of signals from the first set of signals based on a criterion; and
a wireless transmission module configured to transmit the second set of signals to the central device,
wherein the criterion comprises:
the second set of signals has at least one variance value with respect to a predetermined average value, the at least one variance value greater than a predetermined variance threshold value, and
the predetermined average value is defined by an average value of a portion of the first set of signals.

13. A wireless transmission system, comprising:
a central device; and
N peripheral devices configured to transmit signals to the central device,
wherein N is an integer equal to or greater than 20, and
a correlation coefficient of signals transmitted from each of the peripheral devices to the central device is equal to or greater than 90%,
wherein at least one of the peripheral devices comprises:
a capturing module configured to receive a first set of signals;
a processing module configured to select a second set of signals from the first set of signals based on a criterion; and
a wireless transmission module configured to transmit the second set of signals to the central device,
wherein the criterion comprises:
the second set of signals has at least one weighted variance value greater than a maximum weighted variance threshold value, and
the at least one weighted variance value includes a weighted variance between one signal of the second set of signals and its preceding ones of the second set of signals.

14. A wireless transmission system, comprising:
a central device; and
N peripheral devices configured to transmit signals to the central device,
wherein N is an integer equal to or greater than 20, and
a correlation coefficient of signals transmitted from each of the peripheral devices to the central device is equal to or greater than 90%,
wherein at least one of the peripheral devices comprises:
a capturing module configured to receive a first set of signals;
a processing module configured to select a second set of signals from the first set of signals based on a criterion; and
a wireless transmission module configured to transmit the second set of signals to the central device,
wherein the ratio of the second set of signals to the first set of signals is equal to or less than 60%.

15. The wireless transmission system of claim 14, wherein a distance between the central device and each of the peripheral devices is equal to or less than 10 m.

16. The wireless transmission system of claim 14, wherein the criterion comprises:
the second set of signals has at least one value beyond a predetermined range, and
the predetermined range is defined by a predetermined maximum value and a predetermined minimum value.

17. The wireless transmission system of claim 14, wherein:
the processing module comprises a register configured to store the first set of signals,
the wireless transmission module comprises a timer, and
when the timer expires, the transmission module is configured to reset the timer and to transmit the latest signal of the first set of signals stored in the register to the central device.

* * * * *